United States Patent [19]
Guest

[11] 3,837,214
[45] Sept. 24, 1974

[54] SELF-PROPELLED PIPELINE PLUG
[75] Inventor: Robert J. Guest, Duncan, Okla.
[73] Assignee: Halliburton Company, Duncan, Okla.
[22] Filed: Jan. 30, 1973
[21] Appl. No.: 328,022

[52] U.S. Cl............................................. 73/40.5 R
[51] Int. Cl. ............................................ G01m 3/28
[58] Field of Search............ 73/40.5 R, 40.5 A, 432; 138/90, 97

[56] References Cited
UNITED STATES PATENTS

| | | | |
|---|---|---|---|
| 3,381,714 | 5/1968 | Johnson........................... | 73/40.5 R |
| 3,495,546 | 2/1970 | Brown et al...................... | 73/40.5 R |
| 3,690,348 | 9/1972 | Patterson.............................. | 138/97 |
| 3,691,819 | 9/1972 | Guest.............................. | 73/40.5 A |
| 3,722,261 | 3/1973 | Milke.............................. | 73/40.5 R |

Primary Examiner—S. Clement Swisher
Attorney, Agent, or Firm—Burns, Doane, Swecker & Mathis

[57] ABSTRACT

A self-propelled pig carrying plugging means for sealing a pipeline at selected points along the length thereof in which the pig may be stopped and the plugging means selectively actuated for sealing the pipeline. A leak may then be detected and evaluated by pressurizing the pipeline from a point on one side of the pig, and thereafter monitoring pipeline pressure. Alternatively, a leak condition may be separately sensed, the pig positioned to one side of the leak, the plugging means actuated, and the pipeline pressurized from the point on the other side of the leak, for evaluating leak size by monitoring the rate of pipeline depressurization.

20 Claims, 5 Drawing Figures

SELF-PROPELLED PIPELINE PLUG

BACKGROUND OF THE INVENTION

The present invention relates to a method and system for leak detection in a fluid pipeline and more specifically to an apparatus for selectively plugging the pipeline at different locations therewithin.

The apparatus of the present invention has particular utility in the location of leaks in an underground pipeline in which leak detection is difficult and, in the event the fluid is a hydrocarbon, often extremely hazardous to personnel and property along the pipeline route.

The leaks may be detected by sealing the pipeline at two points, pressurizing the pipeline therebetween, and monitoring the pipeline pressure, with depressurization indicating a leak condition.

One known method of plugging the pipeline is to remove the overburden, to cut the pipeline and to weld or otherwise secure a plate thereacross. This method is both time consuming and expensive and may disrupt traffic since piplelines are often laid under or in immediate proximity to roads or other rights of way.

Another known method of plugging the pipeline is to use a pig which is configured to establish a seal with the interior walls of the pipeline, whereby the pumping of fluid into the pipeline may be utilized to position the pig. This "pumping" of a pig through a pipeline is not satisfactory for accurate positioning of the pig, since the movement of the pig in response to the introduction of a given volume of fluid into the pipeline cannot be accurately predicted due to variations in the quality of the seal between the pig and the pipeline. Moreover, the nonreversible or one-way character of pig movement is a serious handicap in that the pig must be retrieved and the entire positioning task begun anew in the event that the pig is pumped beyond the desired location.

In addition, the "pumped" pigs must carry sealing means which are continuously in contact with the interior walls of the pipeline and thus generate significant frictional drag. The "pumped" pig also requires means coacting on command with the pipeline walls to stop pig movement against further pumping so that the pipeline may be hydrostatically pressurized. An example of a pig of this type is disclosed in U.S. Pat. No. 3,561,490, issued Feb. 9, 1971, to Jewel E. Little. In this patent, the means coacting with the pipeline to stop the "pumped pig" are generally unsatisfactory since scoring and scratching of the pipeline generally result from the stopping of the pig. This scoring of the pipeline may be a source of corrosion or fluid contamination and eventually result in mechanically weakening the pipeline.

A still further way of plugging the pipeline is to winch a pig carrying sealing means through the pipeline. Since the position of the pig in the pipeline may be important, the position may be monitored by the length of winching cable dispensed. While the position of the pig may be monitored in this manner, winching a pig through a pipeline by a cable may be both expensive and impractical due to the length and configuration of the pipeline. Alternatively, the position of the pig in the pipeline may be detected by an odometer-connected roller turning against the interior wall of the pipeline. However, the use of an odometer connected to a roller may be inaccurate due to slippage of the roller relative to the interior pipeline surface, particularly where the fluid has lubricative characteristics as in the case of fuels.

A further way to locate the pig involves the use of a sensor to count the number of welds or other magnetic markers along the length of the pipeline. However, the utilization of magnetic markers or weld counting is generally unsatisfactory for pig location due to the insufficient or inaccurate information recorded relative to the placement of the welds or markers during the initial laying of the pipeline.

Thus, although pigs have been used to seal a pipeline, determination of pig position and scoring of the pipeline have been major problems.

Many of the problems associated with pig location have been solved by the use of a pig which is self-propelled and which is remotely controlled. This method of pig propulsion and control is disclosed and claimed in the Guest U.S. Pat. No. 3,691,819, issued Sept. 19, 1972, and assigned to the assignee hereof. In this method, pig location is determined by an electromagnetic energy signal transmitted therefrom through the pipeline and the overburden after the pig is automatically stopped as a result of the acoustic detection of a leak.

It is accordingly an object of this invention to obviate many of the deficiencies of the prior art systems and to provide a novel method and self-propelled apparatus for selectively plugging a pipeline.

Because self-propulsion of the pig requires a portable power supply carried by the pig, the longevity of this power supply and thus the length of the pipeline traversed by the pig is dependent upon the friction between the pig and the pipeline. In this respect, the conventional annular sealing means of the "pumped" pigs are generally unsatisfactory. This results in friction which decreases the lifetime of the portable power supply because the conventional annular sealing means are carried in continuous contact with the inner walls of the pipeline. Power supply longevity is important not only for pig propulsion, but also because a large amount of the energy stored in the portable power supply may be required to power a telemetry transmitter which must generate a signal powerful enough to penetrate both the pipeline and the overburden.

It is therefore a further object of this invention to provide a novel method and apparatus for selectively plugging a pipeline with reduced drag and increased lifetime of the power supply carried by the pig.

Another object of the present invention is to provide a novel method and self-propelled plug which does not damage the internal walls of the pipeline.

As earlier mentioned, leaks may be evaluated by pressurizing the pipeline and monitoring the rate of pipeline depressurization. A problem associated with this technique is the volume of fluid required to fill the section of the pipeline under test. It is thus desirable to isolate small sections of the pipeline whereby the total volume of fluid necessary for testing can be reduced. By accurate positioning of pigs immediately to either side of a detected leak, the length of pipeline that need be pressurized is minimized.

It is accordingly an object of this invention to provide a novel method and pipeline plugging apparatus automatically positioned with respect to a leak and in which the sealing means carried thereby may be automatically or selectively activated in response to the leak.

It is yet another object of this invention to provide a novel method and pig for plugging pipelines automatically or selectively by inflatable sealing means, in which the pipeline fluid is utilized to inflate the inflatable sealing means.

These and many other objects and advantages of the subject invention will, however, be more readily apparent to one skilled in the art to which the invention pertains from the claims and from the following detailed description when read in conjunction with the appended drawings.

THE DETAILED DESCRIPTION

Figure 1:
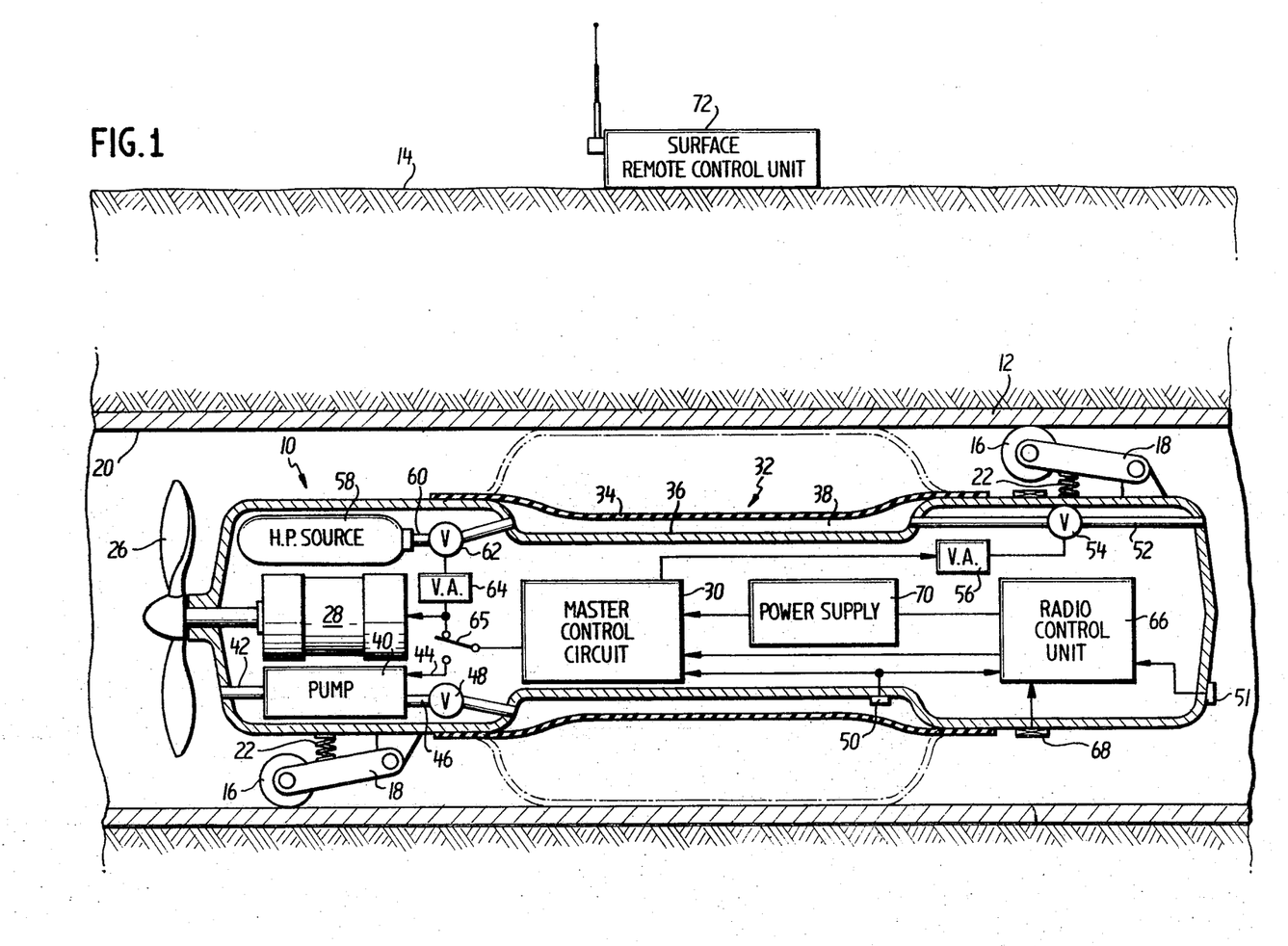
FIG. 1 is a schematic illustration in elevation and in logitudinal section of one embodiment of the self-propelled, remotely controlled pig and remotely actuatable pipeline plug of the present invention.

With reference now to FIG. 1, a pig 10 illustrated within a pipeline 12 buried below a portion of the earth's surface 14 may be provided with rollers 16, six in number in the embodiment illustrated, longitudinally spaced in groups of three disposed at approximately 120° intervals around the pig 10 at either end thereof. Each of the rollers 16 may be secured to the pig 10 by means of a pivot arm 18 and firmly biased into contact with an internal wall 20 of the pipeline 12 by any suitable conventional means such as a spring 22 disposed between the body of the pig 10 and the pivot arm 18. The rollers are utilized to center the pig 10 within the pipeline 12 and may be replaced by other suitable conventional means such as skids in sliding contact with the interior of the pipeline. The rollers 16 are preferred, in that rolling contact with the interior walls 20 of the pipeline 12 reduces friction and the scoring of the interior of the pipeline which may result in future leaks.

When the pig is utilized in pipelines filled with liquid, propulsion for the pig 10 can be provided by means which do not contact the interior walls of the pipeline, such as the illustrated screw 26. This type of propulsion prevents scoring of the pipeline walls. The screw 26 may be driven by a motor 28 under control of a master control circuit 30, hereinafter described. Other suitable conventional means such as means for rotationally driving the rollers 16 in contact with the interior walls 20 of the pipeline may also be utilized.

The pig 10 may be provided with an inflatable pipeline sealing container 32 formed by resilient tubing 34 in combination with an annularly recessed portion 36 of the body of the pig 10, so as to define an annular chamber 38 therebetween. The recessed portion 36 desirably lies centrally of the pig body because the reduced diameter of the pig associated with the recessed portion 36 reduces the likelihood of binding as turns in the pipeline are negotiated by the pig. As shown in phantom, the container 32 may be inflated to contact the interior walls 20 of the pipeline 12 so as to form an annular seal between the walls 20 and the pig 10.

With continued reference to FIG. 1, the container 32 may be inflated by the pipeline fluid or by means carried wholly within the pig. If the pipeline fluid is utilized for container inflation, a pump 40 may be provided having an input orifice communicating with the interior of the pipeline 12 at one end of the pig through an input conduit 42. The pump 40 may have an output orifice which communicates with the interior of the container 32 via an output conduit 46. A one-way or check valve 48 may be provided in the conduit 46 to prevent the flow of fluid from the container 32 to the pump 40. The pump 40 may be controlled in operation by the master control circuit 30, to which a container pressure sensitive transducer 50 may be connected.

An output conduit 52 may be provided for the container 32 which communicates with the interior of the pipeline at the other end of the pig. The container may be deflated via the conduit 52 through a valve 54 which may be actuated by a valve actuator 56 as will be hereinafter described.

If a compressed gas is utilized, either alone or in combination with the pipeline fluid, to inflate the container 32, a suitable conventional high pressure source 58 may be provided in communication with the container 32 through a conduit 60. A valve 62 actuated by a valve actuator 64 may be provided in the conduit 60 and controlled by the master control circuit 30. A single pole, double throw switch 65 may be provided at the control circuit 30. When the switch 65 is in the position shown in FIG. 1, the master control circuit 30 is connected to the valve actuator 64 for actuation thereof. If the switch 65 is in a position opposite to that illustrated, the pump 40 may be energized by the control circuit 30 for the inflation of the container 32.

Both the movement of the pig 10 and the inflation and deflation of the container 32 may be remotely controlled. For this purpose a radio control unit 66 may be provided interiorly of the pig 10 connected to a suitable antenna 68 which lies exteriorly of the pig body. The radio control unit 66 may be connected to the master control circuit 30 for providing control of the pig 10 and the inflation of the container 32 as will hereinafter be described.

The pig 10 may be provided with a portable power supply 70, such as a conventional battery, for delivering direct current to the radio control unit 66 and to the master control circuit 30. The progress of the pig 10 as well as the inflation and deflation of the container 32 may be controlled by a surface remote control until 72.

Figure 2:
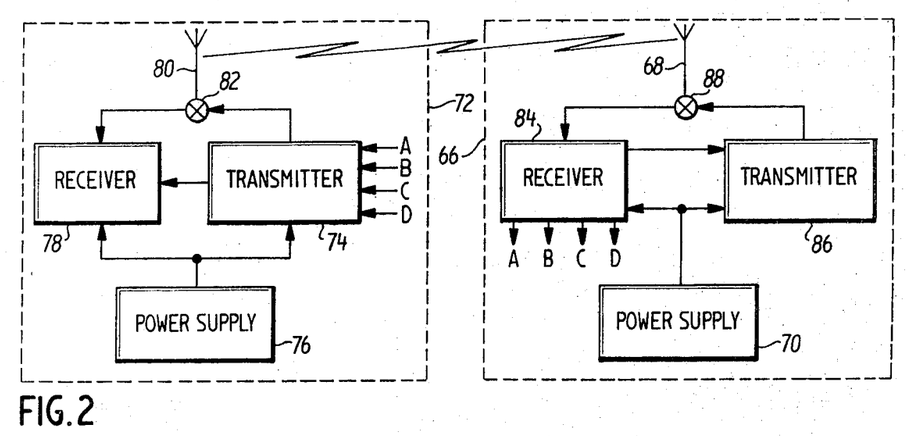
FIG. 2 is a functional block diagram of the control circuit of the pig of FIG. 1.

As illustrated in FIG. 2 and in the above-mentioned Guest patent, communication may be established by electromagnetic wave energy at radio frequencies between the surface remote control unit 72 and the radio control unit 66 in the pig.

For remote control of the pig 10, the surface remote control unit 72 may be carried as a back pack or may be adapted for mobile use. The surface remote control unit 72 may be conventional and may, as illustrated in FIG. 2, include a transmitter 74, a power supply 76, a receiver 78, and an antenna 80 connected to the transmitter and receiver through a conventional transmitreceive (T/R) switch 82. The communication system may be conventional in both circuitry and operation to transmit control signals from the surface remote control unit 72 to the pig 10.

The radio control unit 66 carried by the pig 10 may include a receiver 84 and a transmitter 86 connected to the antenna 68 through a conventional T/R switch 88 and power for the receiver 84 and the transmitter 86 may be provided by the power supply 70 of FIG. 1.

In one method of operation, transit of the pipeline 12 of the pig 10 may be initiated and the surface remote control unit 72 may be positioned at the desired location for plugging the pipeline. The surface remote control unit 72 may periodically or continuously transmit, and when the pig 10 approaches sufficiently for reception of the signals by the radio control unit 66, the master control circuit 30 may deactivate the motor 28. The pump 40 may thereafter be automatically or selectively activated to effect inflation of the container 32 for forming a pipeline plug.

As illustrated in FIG. 2, the receiver 84 may be connected to the transmitter 86 such that the transmitter 86 is activated upon receipt of the signal from the surface remote control unit 72. A signal from the transmitter 86 may then be transmitted via the antenna 68 to the surface remote control unit 72 to indicate that a signal from the surface remote control unit 72 has been received. Thus the operator of the remote control unit 72 may know when the pig 10 has arrived in the vicinity of the surface remote control unit 72.

After the operator of the surface remote control unit 72 has an indication that the pig is in the proper position, the operator may cause a signal to be sent to the pig. This signal may be received by the radio control unit 66 and transmitted to the master control unit 30 for closing the valve 54 in the outlet conduit 52 and for activating the pump 40 to thereby inflate the container with pipleline fluid.

Inflation of the container 32 will force the tubing 34 into the position illustrated in phantom in FIG. 1 in pressural engagement with the internal walls 20 of the pipeline 12 to thereby effect a seal. The operation of the pump 40 may be stopped by the master control circuit 30 when the desired container pressure is reached as indicated by the sensor 50.

After a predetermined time interval and/or after hydrostatic testing has been completed, command signals from the surface remote control unit 72 may be transmitted to deflate the container by acutation of the valve actuator 56. The valve actuator 56 may be actuated by the generation of an appropriate signal from the master control circuit 30 in response to a received signal. The actuation of the valve actuator 56 opens the valve 54 thereby to discharge the container 32 contents exteriorly of the pig 10. After deflation of the container, the surface operator may reposition the pig 10 through reversal of the motor 28 or restart the pig for moving the pig to a different location.

It will be appreciated that two pigs similar to that described in connection with FIG. 1 may be utilized to isolate a predetermined section of pipe, with the location of each pig being determined by the location of a remote control unit. After the two pigs have been located, and the containers thereof inflated, the pipeline section therebetween may be pressurized and the pressure monitored for determining the existence of a leak between the two pigs. Pressurization may be accomplished by opening the valve 54 on one of the pigs and operating the pump 40 within this pig to pump pipeline fluid therethrough into the pipeline between the pigs.

It will be appreciated that the bag or container of the pig through which the pipeline fluid is pumped may be maintained in pressural engagement with the pipeline walls by careful bleeding of the bag contents into the pipeline section between the pigs. In this manner the bag inflation may be maintained while simultaneously pressurizing the pipeline between the pigs.

After pressurization of the pipeline section between the pigs, the pressure of the fluid in the pipeline between the pigs may be sensed at one of the pigs as container pressure by the transducer 50 connected to the radio control unit 66 or as pipeline pressure by an externally mounted transducer 51 connected to the radio control unit 66. The sensed pressure may be radioed to the surface by the unit 66 in a conventional manner for determining pressure decreases and the rate thereof.

If entry into the pipeline is available in the vicinity of a suspected leak, the pigs may be sent in opposite directions from an entry port, stopped and inflated. The pipeline section isolation thereby may then be pressurized by pumping apparatus at the entry port and pressure decreases measured thereat.

Isolation of a leak in this manner eliminates the effects of minor leaks outside the pipeline section effectively isolated by the pigs so that leak size may be evaluated in terms of the depressurization rate. The two pigs may be moved closer together and the pressurization of the pipeline therebetween repeated if desired.

Figure 4:
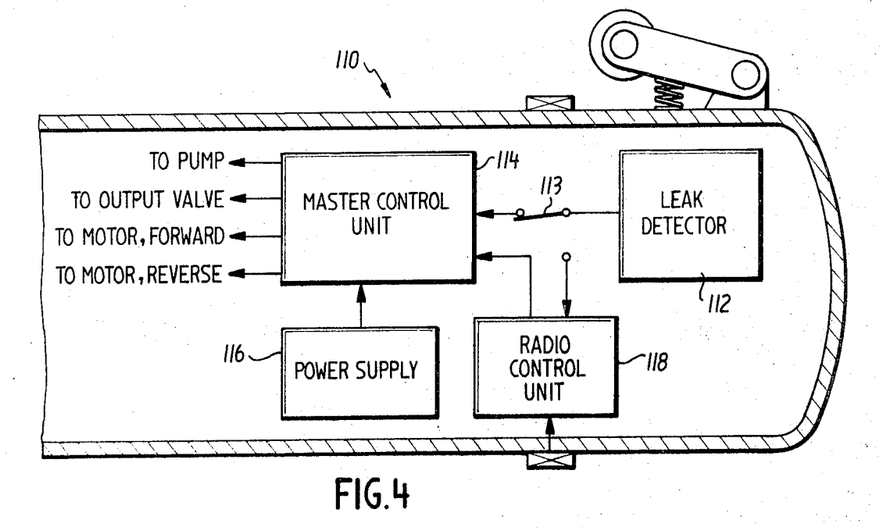
FIG. 4 is a schematic illustration in elevation and longitudinal section of a portion of a second embodiment of a self-propelled pig in which pig movement and pipleine plugging are automatically controlled responsively to detected leaks; and, FIG. 5 is a schematic illustration in elevation and in longitudinal section of an articulated embodiment of the present invention.

In another method of operation, the pig may be provided with a leak detector such as described in the referenced Guest application and discussed herein in connection with FIG. 4. The propulsion of the pig 10 may be automatically stopped on detection of a leak and the container 38 thereafter automatically or selectively inflated. The inhibiting of the propulsion of the pig may be delayed by any suitable conventional delay circuit so that the pig may traverse the pipeline for a predetermined time or distance beyond the leak before the container is selectively or automatically inflated. The direction of propulsion of the second pig, if utilized, may be reversed upon leak detection to position the second pig relative to the leak prior to the selective or automatic inflation of the container 38. In this manner, a small section of pipeline may be automatically isolated for leak evaluation.

In one embodiment of the remote control circuit, the transmitter 74 of FIG. 2 may be provided with four channels herein designated A, B, C and D for transmitting control signals. Control signals in each channel may be transmitted on a different frequency to control respectively: the forward motion of the pig 10; the reverse motion of the pig 10; the inflation of the container 32; and the deflation thereof. Likewise, at the pig, the receiver 84 may be provided with four channels each responsive to a different frequency for receiving a transmitted signal and producing a control signal at a corresponding output terminal of the receiver. In the illustrated embodiment, the receiver 84 is provided with four output terminals A, B, C, and D corresponding to the four transmitted channels.

Figure 3:
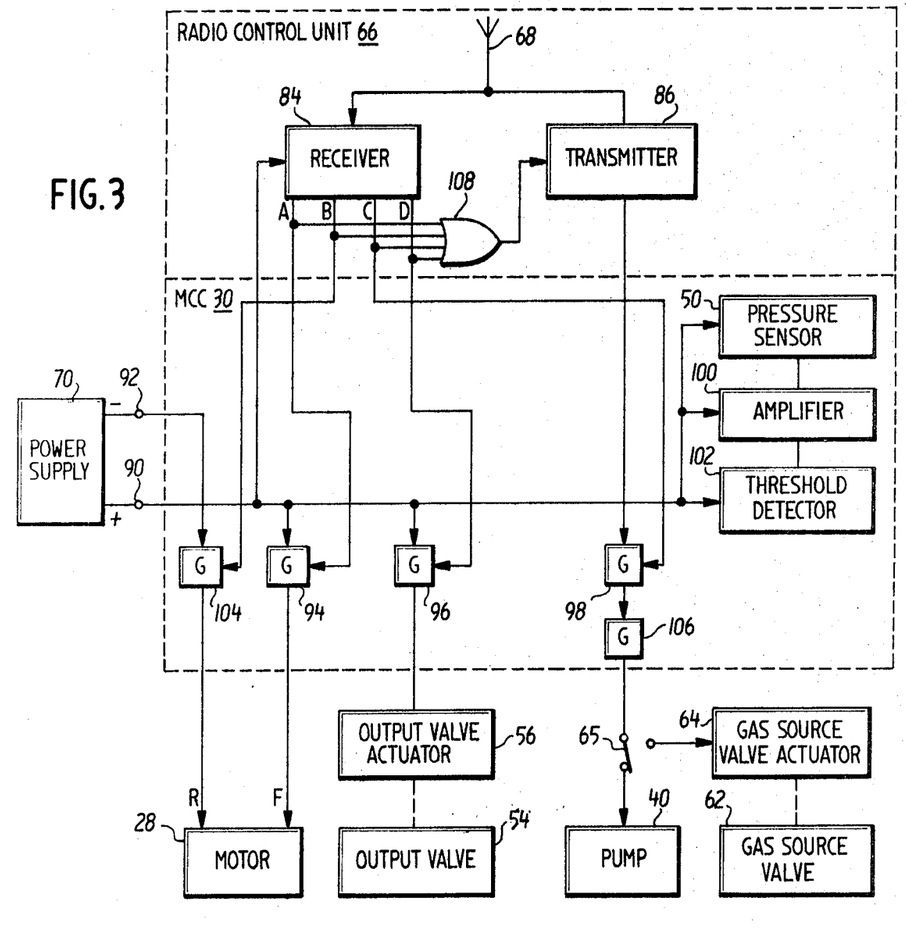
FIG. 3 is a more detailed block diagram of one embodiment of the radio control unit of FIG. 2.

With reference to FIG. 3, where like numerals have been utilized for like elements in FIG. 2, the apparatus carried by the pig may include the aforementioned radio control circuit 66 (including the receiver 84 and the transmitter 86), the master control circuit, MCC 30, the pressure sensor 50 and the power supply 70. The power supply 70 may be provided with positive and negative terminals 90 and 92 in which the positive terminal 90 may be connected to the receiver 84, the transmitter 86, the pressure sensor 50, the input terminal of normally open gates 94, 96 and 98, a conventional amplifier 100 and a conventional threshold detector 102. The negative terminal 92 may be connected to an input terminal of a normally open gate 104.

The output signal developed by the pressure sensor 50 may be amplified by the amplifier 100 and may be applied to the threshold detector 102. The threshold detector 102 may apply signals from the amplifier 100 above a preset threshold to open a normally closed gate 106.

The channel A output terminal of the receiver 84 may be connected to the gating terminal of the gate 94, with the B, C, and D output terminals of the receiver being connected to the gating terminal of the gates 104, 96, and 98, respectively. The A, B, C, and D output terminals of the receiver 84 may also be connected to the input terminals of a four input terminal OR gate 108 having an output terminal connected to the transmitter energization circuits (not shown) of the transmitter 86.

To control movement of the pig, a signal at the output terminal A of the receiver 84 may be applied to the gating terminal of the gate 94 to connect the positive terminal 90 of the power supply 70 to the motor 28 for moving the pig in a forward direction. Likewise, a signal at the output terminal B of the receiver 84 may be applied to the gating terminal of the gate 104 to supply power to the motor 28 to reverse the pig.

A signal at the output terminal C of the receiver 84 may be applied to the gating terminal of the gate 96 to supply power to activate the pump 40. When the chamber pressure in the container 32 reaches a predetermined level, a signal generated by the threshold detector 102 may open the normally closed gate 106 to disconnect the pump 40 from the power supply.

Alternatively or in addition, when a compressed gas is utilized the output terminal of the gate 106 may be connected by the switch 65 to an input terminal of the compressed gas source valve actuator 64 to operate the gas source valve 62 in response to a signal at the output terminal C of the receiver 84.

A signal at the output terminal D of the receiver 84 may be applied to the gating terminal of the gate 96 to open the output valve 54 via the valve acutator 56 to deflate the container 32.

In operation, the pig 10 may be selectively advanced by the generation of an A-channel signal and reversed by the generation of a B-channel signal. The pump or a compressed gas source valve actuator may be selectively actuated by the generation of a C-channel signal. The generation of a D-channel signal may be used to open the output valve 54 to deflate the container 32.

Upon receipt of A, B, C, or D channel signals, the corresponding signals at the output terminals A, B, C, or D of the receiver 84 are applied to the OR gate 108 which activates the transmitter 86 to transmit a signal for indicating that a channel signal has been received at the pig. This provides the operator at the surface remote control unit 72 with an indication that a signal has been received and that the pig is operating as intended.

Other alternatives are, of course, available. The position of the switch 65 may be remotely controlled by a fifth channel signal if desired. The control functions also may be selectively combined if desired to automatically effect the plugging operation upon the inhibiting of pig propulsion.

In addition, a suitable conventional decoder may be utilized to decode digital or frequency coded signals from the surface unit to perform the desired control functions. By way of example, a counter comprising a series of serially connected binary elements may be stepped by received pulses and the coincidence gates selectively connected to the true and false output terminals of the individual binary elements to provide the desired control signals.

With reference now to FIG. 4, a pig 110 similar to that shown in FIG. 1 may be provided with a leak detector 112. The output signal from the leak detector 112 may be applied directly through a single pole, double throw switch 113 to a master control circuit 114. The master control circuit 114 may perform several functions upon receipt of a signal from the leak detector.

The master control circuit 114 in FIG. 4 is shown to control the application of power from a power supply 116 to the pump, motor and output valve actuator (not shown) which are all similar to those described in connection with FIG. 1. The master control unit 114 is arranged to initiate a series of events in timed relationship. For example, power from the power supply 116 to the motor may be interrupted a predetermined time after leak sensing, followed by the application of power to actuate the pump, followed a predetermined time later by the application of power to actuate the output valve, followed by reapplication of power to the motor a predetermined time after output valve actuation. All of these power control functions may be accomplished by conventional signal detection and timer circuitry for setting the timing and sequence of events to provide completely automatic pig operation.

Thus, in operation, the pig 110 may be placed in transit through the pipeline 12 of FIG. 1. Upon the detection of the leak by the leak detector 112, the master control unit 114 may be utilized to limit the continued propulsion of the pig 110 to a predetermined time interval, after which the motor carried by the pig 110 may be deenergized. After deenergization of the motor, the master control unit 114 may cause closure of the output valve in an outlet conduit for the container carried by the pig and activation of the pump to thereby inflate the container with pipeline or other fluid. A predetermined time thereafter sufficient for pipeline pressurization and pressure measurement, the master control unit 114 may open the output valve for deflation and reenergize the motor for moving the "pig" to another location.

It will be appreciated that a radio control unit 118 shown in FIG. 4 may be provided for applying overriding signals to the master control unit 114 and thereby provide the pig with a selective manual operation. In this mode, operation may be accomplished by connecting the leak detector 112 to the radio control unit 118, as by the switch 113, so that rather than automatically stopping the pig, a signal may be sent by the radio control unit to a surface remote control unit when a leak is detected. Thereafter the surface unit (not shown in this Figure) may be used to send control signals back to the radio control unit 118 for controlling the pig under manual supervision. In this respect, the radio control unit 118 may be similar to the radio control unit 66 described in connection with FIGS. 1, 2 and 3.

Figure 5:
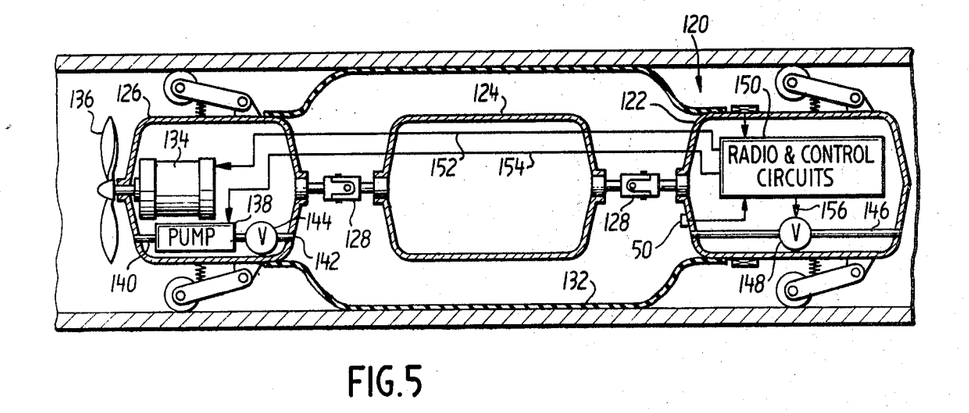

Referring now to FIG. 5, an articulated pig 120 is illustrated which includes a forward section 122, a central section 124 and an aft section 126. The forward and aft sections 122 and 126 may be supported by the same roller arrangement as indicated for the pig of FIG. 1. The forward section 122 may be secured to the central section 124 by a swivel or universal joint 128, and the central section 124 may be secured to the aft section 126 by a similar joint 128. These swivel joints desirably permit limited relative axial and rotational movement.

The pig 120 may be provided with a tubular container member 132 of flexible material which extends between the forward and aft sections of the pig and is suitably sealed to the forward and aft section. The bag or container member 132 is shown to lie coaxially of the central section 124 and thus is long enough to engage, when inflated, a sufficient length of pipeline wall as to form an effective fluid tight seal. While it is somewhat easier to use a container member 132 that is coextensive with the central section 124, the necessary seal is not always reliably attained.

The pig 120 may be provided with a suitable motor 134 and a screw 136 in the aft section 126. The aft section 126 may also be provided with a pump 138 having an input office communicating exteriorly thereof via a conduit 140. An output orifice on the pump 138 may communicate with the interior of the chamber formed by the container 132 via a conduit 142 and a check valve 144 may be provided as earlier described.

The output channel for the container 132 may include a conduit 146 into which is inserted a valve 148 actuatable to deflate the container. Radio and master control circuits described hereinbefore in connection with the pig of FIG. 1 may be grouped together and are herein described as a control unit 150. The control unit 150 may be located in the forward section 122, having control lines 152 and 154 extending from the control unit 150 to the aft section 126 for controlling the motor means 134 and the pump 138. A control line 156 may connect the control unit 150 to the valving means 148 for actuation thereof. Pig movement and container actuation is accomplished similarly to that indicated for the pig of FIG. 1.

In another method of operation, the pipeline plug of the present invention may be inflated sufficiently to provide sealing contact with the interior walls of the pipeline and thereafter pumped in a conventional manner into the known proximity of a leak. Thereafter, the pipeline plug may be remotely activated for positioning under control of the surface remote control unit as earlier described. Alternatively, the pipeline plug of the present invention may be continuously pumped through the pipeline until such time as an indication of a leak or a control signal from the surface remote control unit is received. Upon receipt of such a signal, the pipeline plug may be braked and thus locked into the desired position within the pipeline by increasing the pressure within the chamber 38 or other suitable conventional mechanical braking means (not shown).

As an alternative to the use of the pumps 40 and 44 respectively in FIGS. 1 and 5, the pipeline plug in the present invention may achieve the desired pressurization of the chamber 38 by means of a pilot valve and a exposed ratio, i.e., a piston surface area differential between the end exposed to the pipleline fluid and the end exposed to the chamber 38. By means of such a ratio, the chamber 38 may be pressurized to a greater extent than the fluid-filled pipeline so that the plug may resist further downstream movement under the pressure exerted by the pipeline fluid.

ADVANTAGES AND SCOPE OF THE INVENTION

From the foregoing description of the preferred embodiments, many of the advantages will be readily apparent. For example, the pig described may be located in the pipeline without injuring the pipeline walls and may be self-propelled for long periods of time the pipeline sealing means may be retracted away from the pipeline walls during positioning of the pig.

A pig of the type described may be operated in many modes due to the ability to selectively or automatically inflate the sealing means. Thus, the pig may be operated completely automatically or may be remotely controlled from the surface by a surface remote control unit. Moreover, the pig may be articulated or have a recessed portion to permit negotiation of sharp turns in the pipeline.

The present invention may thus be embodied in other specific forms without departing from the spirit or essential characteristics thereof. The presently disclosed embodiments are therefore to be considered in all respects as illustrative and not as restrictive, the scope of the invention being indicated by the appended claims rather than by the foregoing descrpition and all changes which come within the meaning and range of equivalency of the claims are therefore intended to be embraced therein.

What is claimed is:

1. Apparatus for selectively plugging a pipeline comprising:
    a self-propelled pig adapted to traverse the pipeline through the interior thereof;
    means including an inflatable container adapted to be deflated during traverse of the pipeline and inflated when actuated, said container being carried by said pig for sealing the pipeline against fluid flow through the pipeline pumping means carried by said pig in communication with the interior of the pipeline and said container whereby said container may be inflated with fluid in the pipeline; and
    electromagnetic wave energy responsive means for remotely actuating said sealing means.

2. The apparatus of claim 1 including means for sensing the fluid pressure in said container and means for deactivating said pumping means connected to said sensing means.

3. The apparatus of claim 1 further having means including compressed gas carried by said pig for inflating said container.

4. The apparatus of claim 1 wherein said pig comprises a plurality of articulated sections to facilitate the negotiation of bends in the pipeline when said container is in a deflated condition; and, wherein said container is flexible and is sealed to said articulated sections to thereby increase the length of the pipeline engaged by said container when inflated to provide a reliable pressural seal.

5. Apparatus for selectively plugging a pipeline comprising:
a self-propelled pig adapted to traverse the pipeline through the interior thereof;
plugging means including pumping means carried by said pig for plugging the pipeline over a significant continuous length of the pig;
means carried by said pig for detecting fluid leaks in the pipeline; and
means for inhibiting the propulsion of said pig and for automatically actuating said plugging means in response to said leak detection means whereby the pipeline plugging means may be actuated in the vicinity of the detected leak.

6. The apparatus of claim 5 including electromagnetic wave energy responsive means carried by said pig for actuating said plugging means.

7. The apparatus of claim 5 wherein said plugging means includes a container carried by said pig circumferentially surrounding a portion thereof for inflation into pressural engagement with the pipeline to thereby form a pressural seal between the walls of the pipeline and said portion of the pig.

8. The apparatus of claim 5 wherein said propulsion inhibiting means includes means for atuomatically poisitioning said pig a predetermined distance from a detected leak and for automatically inflating said container at said position.

9. The apparatus of claim 8 including electromagnetic wave energy responsive means carried by said pig for actuating said plugging means.

10. Apparatus for selectively plugging a pipeline comprising:
a self-propelled pig adapted to traverse the pipeline through the interior thereof; and
sealing means including pumping means carried by said pig over a significant portion of the length thereof in a position retracted away from the interior walls of the pipeline and selectively actuatable into pressural engagement over a significant and continuous portion of the length of the pig walls of the pipeline to effect plugging of the pipeline whereby drag due to contact of said sealing means with the pipeline is eliminated during the positioning of the pig.

11. The apparatus of claim 10 wherein said sealing means includes an inflatable container; and,
wherein said pumping means include means for inflating said container with fluid from the pipeline.

12. The apparatus of claim 10 including electromagnetic wave energy responsive means carried by the pig and for remotely controlling the propulsion of said pig and for remotely actuating sealing means.

13. A method of plugging a pipeline comprising the steps of:
a. traversing the interior of a pipeline with a self-propelled pig having flexible walls over a significant portion thereof;
b. inhibiting the movement of the pig; and
c. actuating the pig to form a pipeline plug by pumping pipeline fluid into said pig to inflate said flexible walls into sealing engagement with the pipeline walls.

14. The method of claim 13 wherein the pig is actuated automatically in response to pig movement inhibition.

15. The method of claim 13 wherein the pig is actuated in response to a remotely generated electromagnetic wave energy signal.

16. A method of plugging a pipeline comprising the steps of:
a. traversing the interior of a pipeline with a self-propelled plug;
b. detecting a leak by means carried by the plug; and
c. inhibiting the movement of the plug and actuating a pump to plug the pipeline in response to leak detection.

17. The method of claim 16 wherein the plug is actuated in response to a remotely generated electromagnetic wave energy signal.

18. The method of claim 16 wherein the plug is automatically positioned relative to the detected leak prior to the inhibiting of the movement of the plug.

19. A method of isolating a section of pipeline for leak evaluation comprising the steps of:
a. traversing the interior of a pipeline with a first self-propelled pig;
b. detecting a leak by means carried by the pig;
c. automatically stopping the pig at one side of a detected leak;
d. actuating the pig to form a fluid-tight pipeline plug;
e. traversing the pipeline with a second self-propelled pig;
f. detecting the same leak by means carried by the second plug;
g. automatically stopping the second pig at the other side of the detected leak; and,
h. actuating the second pig to form a second fluid-tight pipeline plug whereby the two pigs form plugs on opposite sides of a detected pipeline leak.

20. The method of claim 19 including the step of pumping fluid from the pipeline through one of the plugs into the pipeline section between the plugs to effect the pressurization thereof.

* * * * *

UNITED STATES PATENT OFFICE
CERTIFICATE OF CORRECTION

Patent No. 3,837,214      Dated September 24, 1974

Inventor(s) Robert J. Guest

It is certified that error appears in the above-identified patent and that said Letters Patent are hereby corrected as shown below:

IN THE CLAIMS

In Claim 10, line 45 after the word pig insert

--with the interior--

Signed and sealed this 31st day of December 1974.

(SEAL)
Attest:

McCOY M. GIBSON JR.
Attesting Officer

C. MARSHALL DANN
Commissioner of Patents